(12) United States Patent
Blanton et al.

(10) Patent No.: US 7,867,566 B2
(45) Date of Patent: Jan. 11, 2011

(54) METHOD FOR FABRICATING REINFORCED COMPOSITE MATERIALS

(75) Inventors: Lee Alan Blanton, Cincinnati, OH (US); Gregory Joseph Meibers, Mason, OH (US); Robert Paul Fairbanks, Cincinnati, OH (US); Stephen Mark Whiteker, Covington, KY (US); Richard Thomas Price, Yorba Linda, CA (US); Matthew Bernard Buczek, Hamilton, OH (US); Warren Rosal Ronk, Westchester, OH (US)

(73) Assignee: General Electric Company, Schenectady ( * ) Notice: Subject to any disclaimer, the term of this patent is extended or adjusted under 35 U.S.C. 154(b) by 177 days.

(21) Appl. No.: 11/925,331

(22) Filed: Oct. 26, 2007

(65) Prior Publication Data
US 2009/0142496 A1 Jun. 4, 2009

Related U.S. Application Data

(62) Division of application No. 11/021,804, filed on Dec. 22, 2004, now Pat. No. 7,332,049.

(51) Int. Cl.
*B05D 3/00* (2006.01)
*B05D 3/12* (2006.01)

(52) U.S. Cl. .................. 427/350; 156/174; 156/285; 156/312; 156/307.1; 164/98; 264/102; 264/257; 264/258; 264/510; 427/288; 427/384; 427/394; 428/293.4; 428/295.1; 428/297.4; 428/298.7

(58) Field of Classification Search .................. 427/350
See application file for complete search history.

(56) References Cited

U.S. PATENT DOCUMENTS

| 2,724,673 A | 11/1955 | Hunter |
| 2,794,481 A | 6/1957 | Anderson |
| 3,165,569 A | 1/1965 | Bright |
| 4,215,161 A | 7/1980 | Seibold et al. |
| 4,248,649 A | 2/1981 | Harrison et al. |

(Continued)

FOREIGN PATENT DOCUMENTS

GB 1466385 11/1973

(Continued)

*Primary Examiner*—Michael Kornakov
*Assistant Examiner*—Alexander Weddle
(74) *Attorney, Agent, or Firm*—Morcella R. Louke; William Scott Andes; General Electric Company

(57) ABSTRACT

A method for fabricating a reinforced matrix composite comprising the step of providing a composite preform having a fibrous structure and applying matrix material onto the preform in locations along the preform. A barrier material is applied to at least a portion of the coated preform to direct the flow of matrix material into the preform. The composite preform is heated to a temperature sufficient to render the matrix material viscous and insufficient to cure the matrix material. The pressure to the interior of the composite preform is reduced, while the pressure to the barrier material is increased. The temperature is maintained to flow the matrix material into the composite preform and to force gases from the fibrous structure. The composite preform is then cured and cooled to form a reinforced matrix composite having a low void content and a substantially uniform matrix distribution.

11 Claims, 11 Drawing Sheets

U.S. PATENT DOCUMENTS

| | | | |
|---|---|---|---|
| 4,519,290 A * | 5/1985 | Inman et al. ................... 87/7 |
| 4,622,091 A * | 11/1986 | Letterman .................. 156/286 |
| 4,798,694 A | 1/1989 | Sugata et al. |
| 4,867,822 A | 9/1989 | Bannink, Jr. |
| 4,902,215 A | 2/1990 | Seemann, III |
| 4,963,210 A | 10/1990 | Corr et al. |
| 5,071,506 A | 12/1991 | Nelson et al. |
| 5,084,219 A | 1/1992 | Sigur |
| 5,145,621 A * | 9/1992 | Pratt ........................ 264/102 |
| 5,211,789 A | 5/1993 | Christian et al. |
| 5,259,724 A | 11/1993 | Liston et al. |
| 5,295,805 A | 3/1994 | Akamatsu et al. |
| 5,336,044 A | 8/1994 | Forrester |
| 5,350,545 A | 9/1994 | Streckert et al. |
| 5,352,484 A | 10/1994 | Bernard et al. |
| 5,429,693 A | 7/1995 | Rose |
| 5,433,915 A | 7/1995 | Yamamoto et al. |
| 5,457,053 A | 10/1995 | Burd et al. |
| 5,460,651 A | 10/1995 | Flinchum et al. |
| 5,486,086 A | 1/1996 | Bellia et al. |
| 5,486,256 A | 1/1996 | Romesberg et al. |
| 5,506,607 A | 4/1996 | Sanders, Jr. et al. |
| 5,513,949 A | 5/1996 | Armstrong |
| 5,525,035 A | 6/1996 | Ben-Porat et al. |
| 5,560,883 A | 10/1996 | Lane et al. |
| 5,565,162 A | 10/1996 | Foster |
| 5,571,357 A | 11/1996 | Darrieux et al. |
| 5,597,435 A | 1/1997 | Desautels et al. |
| 5,667,813 A | 9/1997 | Mizutani et al. |
| H1779 H | 2/1999 | Watson, Jr. et al. |
| 5,900,194 A | 5/1999 | Ashton |
| 5,902,537 A | 5/1999 | Almquist et al. |
| 5,935,475 A | 8/1999 | Scoles et al. |
| 5,968,445 A | 10/1999 | McCarville et al. |
| 6,000,453 A | 12/1999 | Davis |
| 6,050,315 A * | 4/2000 | Deckers et al. ............. 156/433 |
| 6,146,576 A | 11/2000 | Blackmore |
| 6,149,851 A | 11/2000 | Deckers et al. |
| 6,214,279 B1 | 4/2001 | Yang et al. |
| 6,221,475 B1 | 4/2001 | Domergue et al. |
| 6,280,550 B1 | 8/2001 | Steibel et al. |
| 6,315,520 B1 | 11/2001 | Haje et al. |
| 6,383,960 B1 | 5/2002 | Everett et al. |
| 6,391,436 B1 * | 5/2002 | Xu et al. .................. 428/298.1 |
| 6,409,875 B1 | 6/2002 | Giardello et al. |
| 6,527,894 B1 | 3/2003 | Rocker et al. |
| 6,537,470 B1 * | 3/2003 | Wood et al. ................ 264/29.5 |
| 6,562,269 B2 | 5/2003 | Fong |
| 6,565,792 B2 | 5/2003 | Hemphill |
| 6,620,369 B1 | 9/2003 | Mead |
| 6,627,019 B2 | 9/2003 | Jarmon et al. |
| 6,638,883 B2 | 10/2003 | Gaffney et al. |
| 6,660,208 B2 | 12/2003 | Hanna |
| 6,699,419 B1 | 3/2004 | Kia et al. |
| 6,752,961 B2 | 6/2004 | Kopf-Sill et al. |
| 6,756,112 B1 | 6/2004 | Wapner et al. |
| 6,780,462 B2 | 8/2004 | Purdy et al. |
| 6,802,931 B2 | 10/2004 | Fujihira |
| 6,803,090 B2 | 10/2004 | Castiglione et al. |
| 6,818,159 B2 | 11/2004 | Hinz |
| 6,821,087 B2 | 11/2004 | Matsumoto et al. |
| 2004/0104516 A1 | 6/2004 | Benson et al. |
| 2004/0140587 A1 | 7/2004 | Hadley |
| 2005/0040553 A1 * | 2/2005 | Slaughter et al. ........... 264/40.1 |

FOREIGN PATENT DOCUMENTS

| | | |
|---|---|---|
| GB | 159886 | 6/1984 |
| WO | 01/00405 | 1/2001 |

* cited by examiner

METHOD FOR FABRICATING REINFORCED COMPOSITE MATERIALS

CROSS-REFERENCE TO RELATED APPLICATIONS

This application is a divisional of U.S. Utility application Ser. No. 11/021,804, filed on Dec. 22, 2004 entitled "A METHOD FOR FABRICATING REINFORCED COMPOSITE MATERIALS", which is related to application Ser. No. 11/021,893, filed contemporaneously with the Application on Dec. 22, 2004 entitled "AN APPARATUS FOR FABRICATING REINFORCED COMPOSITE MATERIALS" assigned to the assignee of the present invention and which is incorporated herein by reference in its entirety, and to application Ser. No. 11/021,805, filed contemporaneously with the Application on Dec. 22, 2004 entitled "A REINFORCED MATRIX COMPOSITE CONTAINMENT DUCT" assigned to the assignee of the present invention and which is incorporated herein by reference in its entirety.

FIELD OF THE INVENTION

This invention relates to a method for making reinforced matrix composite materials. In particular, the present invention involves a method for making reinforced matrix composite materials for gas turbine engine containment ducts.

BACKGROUND OF THE INVENTION

Aircraft engine design continually requires components of aircraft engines to have lighter weight materials to increase the aircraft's fuel efficiency and thrust capabilities. In the past, aircraft components have been made with steel. However, steel is relatively heavy and has been replaced with lighter weight high strength materials, such as aluminum or titanium. A further development in producing lightweight parts has resulted in the advent of non-metallic materials, such as composites comprising graphite fibers embedded within a polyimide resin. Composite materials are materials that include embedded fibers inside of a matrix material. The fibers provide reinforcement for the matrix material. The fiber structure prior to being embedded in the matrix is generally referred to as a preform. Graphite fibers embedded within a polyimide resin have drawbacks, including difficulty molding the material into parts, high porosity, microcracking, delamination, and expensive equipment and processes.

A composite fan duct for use in a gas turbine engine is required to have high strength flanges and composite material that is substantially devoid of wrinkles and waves.

Graphite epoxy composite fan ducts have been manufactured using a cross-over tool, disclosed in U.S. Pat. No. 5,145,621 to Pratt (the '621 patent), which is herein incorporated by reference in its entirety. In the '621 patent woven graphite fiber preform is mounted on a large spool to form the graphite epoxy composite fan duct. The fibers are situated to provide a flange at either end of the spool. The shape of the spool substantially defines the final shape of the finished composite. The cross-over tool pulls the fibers of the graphite on a spool to provide tension. The tool pulls the fiber through the use of a complex spider tool that encircles the flange portion of the fibers and provides pressure when in combination with three independent vacuum envelopes. The drawbacks of the cross-over tool and method disclosed in the '621 patent includes a complicated process, and an expensive tool that is difficult to use.

Graphite epoxy composite fan cases have also been manufactured using a mold system utilizing a elastomeric material to assist in providing a force on plies of reinforcing material during manufacture, disclosed in U.S. Pat. No. 5,597,435 to Desautels et al. (the '435 patent), which is herein incorporated by reference in its entirety. To produce a composite matrix, uncured fiber-reinforced prepreg-type plies (i.e., plies) are mounted onto a mold. Prepreg plies are plies that are impregnated with uncured matrix material before being mounted on the mold. A forcing member and restraining member are placed onto the plies to hold the plies in place. The forcing member is placed between the restraining member and the plies on the mold. The mold, plies, restraining member and forcing member are placed into a furnace and heated. As the assembly is heated, the forcing member uniformly expands and a uniform pressure is applied to the plies. The result is that the plies are compacted as the temperature is raised. The '435 patent process has the drawback that it only debulks the material and does not pull taut the fabric to provide fiber orientation that provides the finished composite with high strength and uniformity.

Current methods for impregnating matrix material into reinforcing fiber preforms involves placing a matrix material film layer or layers on or within layers of the reinforcing fiber preforms to cover all or the majority of the preform. The entire preform is coated so that during a heated resin infusion phase, the matrix material melts and flows through the thickness of the preform to impregnate it. The impregnation is done using single layer or multiple layers of resin film. The resin film is applied onto the entire surface of the reinforcing fiber preform. Alternatively, the matrix material may be interleaved between layers of the preform to cover all the layers of reinforcing fiber preform. Full coverage of the resin layers on the preform entrap air, volatile material from the matrix material or other gases that may form voids (i.e. void space), which can form undesirable porosity in the body of the cured part. The porosity is particularly undesirable in more complex parts at or near part features. Features include portions of composite material that extend from planar sections of the part. Examples of features include stiffener sections or inserts in gas turbine engine parts. Porosity resulting from void space in the cured reinforced matrix composite may reduce the parts' mechanical properties and may create unacceptable surface features such as pitting. The complete coverage of the reinforcing fiber preform has the additional drawback that the method is difficult to practice and requires a significant amount of time to apply, because the resin must be applied over the entire surface area of the preform.

The present invention solves the problems of the prior art by providing a method and tool that forms the fiber reinforced matrix composite without the disadvantages of the prior art.

SUMMARY OF THE INVENTION

The present invention is a method for fabricating a reinforced matrix composite having low porosity. The method comprises the step of providing a composite preform having a fibrous structure and applying a preselected amount of matrix material onto the preform in preselected locations along the preform. A barrier material is applied to at least a portion of the coated preform to direct the flow of matrix material into the preform. The composite preform is heated to a temperature sufficient to render the matrix material viscous and insufficient to cure the matrix material. The pressure to the interior of the composite preform is reduced, while the pressure to the barrier material is increased. The temperature is maintained to flow the matrix material from the predetermined locations into the composite preform to force gases from the fibrous structure. The composite preform is heated to the curing temperature. The matrix is cured at the curing temperature and cooled to form a reinforced matrix composite having a low void content and a substantially uniform matrix distribution.

The method of the present invention also includes a method for fabricating a reinforced matrix composite, comprising the step of providing a fibrous composite preform comprising at least one surface having a midpoint, a first edge and a second edge along a centerline. A curable matrix material having a defined curing temperature is applied onto the preform in preselected locations along the preform. The preform is oriented vertically along the axis with the first edge above the midpoint and the second edge below the midpoint. The pressure to the first edge is reduced. The first edge is placed in fluid communication with the second edge. The matrix material is heated to a temperature sufficient to render it viscous, but below its defined curing temperature. The viscous matrix material is collected flowing from the second edge. The matrix material is circulated from the second edge to the first edge through the fluid communication. The temperature and reduced pressure are maintained until the matrix material has been uniformly distributed across the preform. The impregnated preform is heated to a second temperature to cure the matrix material, and the temperature is maintained for a sufficient time to completely cure the composite article. The preform is then cooled to form a reinforced matrix composite having a low void content and a substantially uniform distribution of matrix material.

The method of the present invention also includes a method for fabricating a reinforced matrix composite part for a gas turbine engine, comprising the step of providing a tool having a tool surface. A composite preform is positioned on at least a portion of the tool surface. The preform comprises a center, a first edge and a second edge. A plurality of plates are attached to the tool surface, each plate comprising a first and second surface. The plates are positioned with each second surface adjacent to at least a portion of the composite preform. The plates comprise a material having a thermal coefficient of expansion greater than the thermal coefficient of expansion of the composite preform. The tool comprises a material having a thermal coefficient of expansion greater than the thermal coefficient of expansion of the composite preform. A matrix material having a preselected curing temperature is provided. The matrix material is applied to the preform. A greater amount of matrix material is placed at the center of the preform than on each of the first and second edges. A layer of barrier material is applied to at least a portion of the coated preform over the matrix material to isolate the matrix material from an external environment. The barrier material also enables flow of matrix material from the center to the first and second edges. A vacuum membrane is provided and the tool and preform are placed inside. The composite preform is heated to a temperature sufficient to render the matrix material viscous, but below the curing temperature of the matrix material. The temperature is maintained to flow the viscous matrix material from the predetermined locations into the composite preform. The elevated temperature also causes thermal expansion of the tool and the plates that is greater than the thermal expansion of the composite preform. The thermal expansion of the tool and the plate relative to the composite preform cause tensional force across the composite preform.

A reduced pressure is applied to the interior of the vacuum membrane sufficient to draw gas from the edges of the preform. An increased pressure is applied to the exterior of the vacuum membrane to apply force across the first surface of the plate through the membrane. The reduced pressure to the interior of the vacuum membrane and the increased pressure to the exterior of the vacuum membrane facilitate the flow of the matrix material into the composite preform, while maintaining the positioning of the preselected portion of the composite preform adjacent to the plurality of plates. Matrix material flowing from one of the first edge or the second edge is collected. The matrix material collected is distributed to the one of the first edge or the second edge from which excess material was not drawn. After the matrix material has been distributed across the preform, the preform is then heated to a second temperature sufficient to cure the matrix material. Thereafter, the preform is cooled to form a reinforced matrix composite having a low void content and a substantially uniform matrix distribution.

The method and tool of the present invention forms a lightweight reinforced matrix composite material suitable for use as composite containment ducts, such as fan casings, wherein the composite materials have high strength and uniformity.

The method of the present invention is particularly suitable for fabrication of turbine airfoil components for gas turbine engines. In particular, the method of the present invention is suitable for the fabrication of composite containment ducts, such as fan casings. An advantage of the present invention is that the present invention allows the fabrication of composite containment ducts capable of containing fan blades that break loose from the gas turbine engine during operation.

The method and tool of the present invention is particularly suitable for fabrication of large composite parts, including cylindrical parts having a diameter of greater than about 5 feet, including parts having a diameter of about 10 feet. An advantage of the present invention is that the tool and method are capable of fabricating large parts, such as large composite fan casings, while maintaining the containment properties, the lighter weight, the high strength and the substantial uniformity throughout the part.

The method and tool of the present invention provides a method for manufacturing fiber reinforced matrix composites having the shape of the finished product, requiring little or no trimming prior to installation. An advantage of the present invention is that the tool and method produce parts that require little or no additional steps prior to installation and use. The reduction or elimination of addition steps decrease cost and time for fabrication.

The method and tool of the present invention provides a method for manufacturing fiber reinforced matrix composites that has a high uniformity of composition and less defects, such as porosity and wrinkling. Uniform composition and less defects allows for less scrapped and/or repaired parts. Less scrapped and/or repaired parts allows for fabrication of composite parts, including large composite parts, with less cost.

The method and tool of the present invention provides a method for manufacturing fiber reinforced matrix composites using simple, inexpensive equipment. Additionally, part removal from the tool requires little or no additional disassembly of the tool. An advantage of the present invention is that the equipment and labor costs required to fabricate fiber reinforced composite containment ducts are decreased because the equipment is less expensive and does not require extensive assembly or disassembly during fabrication of the part.

The method and tool of the present invention provides a method for manufacturing fiber reinforced matrix composites wherein the process only requires a single vacuum envelope.

An advantage of the present invention is that the tool and method is that a single vacuum envelope can provide the necessary containment and forces required to fabricate fiber reinforced composite containment ducts without the use of multiple vacuum envelopes. The use of the single envelope provides a more substantially uniform application of vacuum and requires less assembly and disassembly than multiple envelopes.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
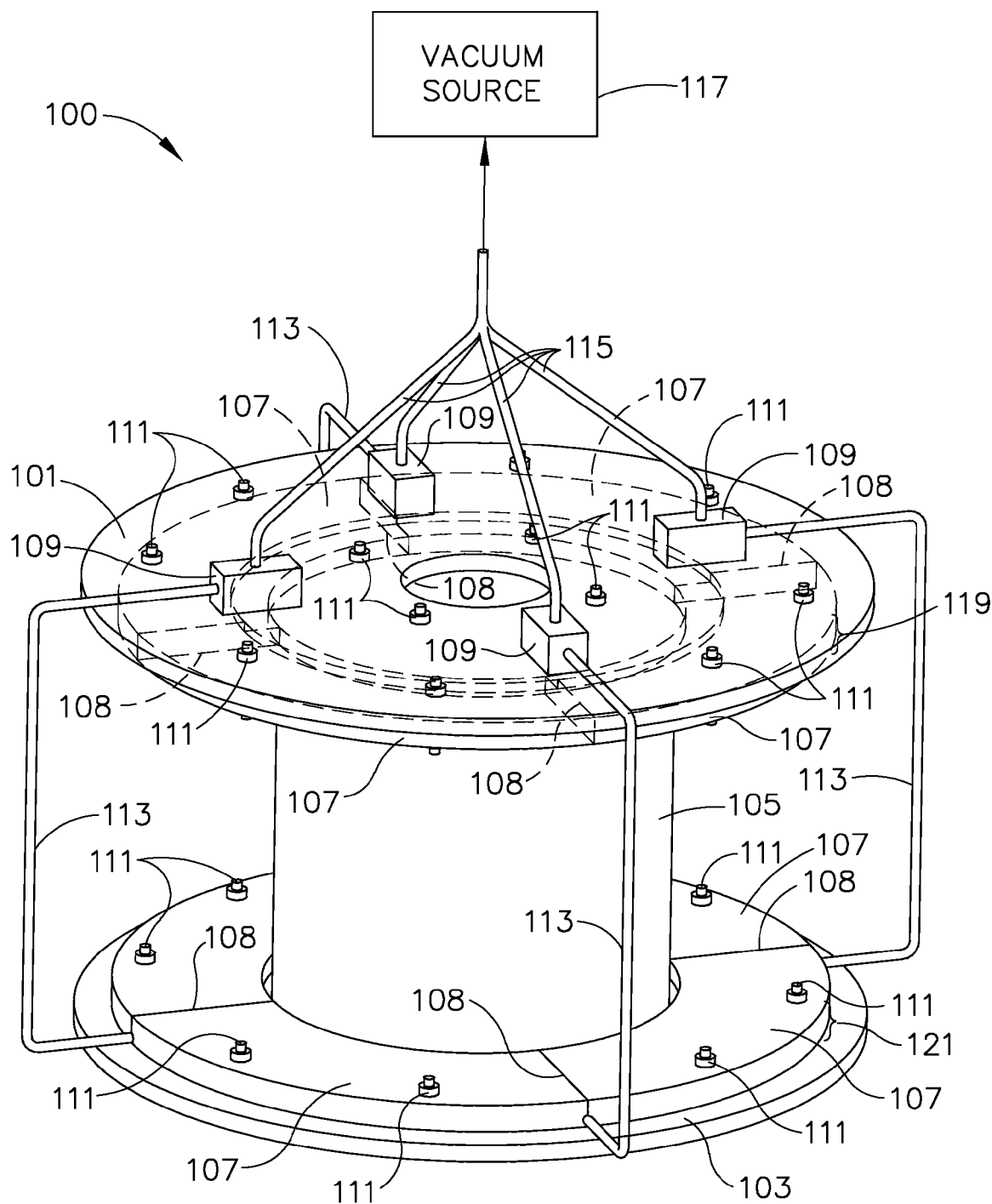
FIG. 1 is a perspective view of a tool according to the present invention.

FIG. 1 shows a composite duct-forming tool 100 according to the present invention. The tool 100 includes a substantially cylindrical body 105. A first endplate 101 and a second endplate 103 are positioned adjacent to the opposed planar ends of the body 105. The body 105 and first and second endplates 101 and 103 are fabricated from a material having a greater thermal coefficient of expansion than the workpiece held by the tool 100. Material for the body 105 and first and second endplates 101 and 103 include, but are not limited to, metals or alloys. Suitable materials for the body 105 include aluminum and steel. The first endplate 101 is fastened to the body 105 with stress relief fasteners 111. The second endplate 103 adjacent to the body 105 is attached to the body 105. The body 105 has a substantially cylindrical geometry. The substantially cylindrical body 105 preferably tapers from a smaller diameter adjacent to the first endplate 101 to a larger diameter at the second endplate 103. Although FIG. 1 illustrates a cylindrical body 105, the body is not limited to a cylindrical shape. Alternate geometry for the body include, but are not limited to, rectangular, oval, and triangular geometries. In an alternate embodiment, the body 105 has substantially cylindrical geometry with a smaller diameter at the midpoint between the first and second endplates 101 and 103 and a larger diameter at each of the ends of the body 105. The body 105 may be fabricated in multiple detachable pieces to facilitate removal of finished reinforced matrix composite parts.

FIG. 1 shows a first set of flange shoes 119 positioned adjacent to the first endplate 101 circumferentially around the body 105 on the surface of the first endplate 101 nearest to the second endplate 103. A second set of flange shoes 107 are positioned adjacent to the second endplate 103 circumferentially around the body 105 on the surface of the second endplate 103 nearest to the first endplate 101. The flange shoes 107 of each of the first and second set of flange shoes 119 and 121 contact each other at a flange shoe junction 108. Flange shoes 107 are plates fabricated from a material having a greater thermal coefficient of expansion than the workpiece held by the tool. Material for the flange shoes 107 include, but are not limited to, metals or alloys. Suitable materials for the flange shoes 107 include aluminum and steel. The flange shoes 107 are fastened to the first and second endplates 101 and 103 by stress relief fasteners 111. In addition to fastening the first and second endplates 101 and 103, the stress relief fasteners 111 also fasten the first endplate 101 to the body 105. As shown in FIG. 1, the stress relief fasteners 111 fastening the flange shoes 107 extend through the first and second endplates 101 and 103 and through the flange shoes 107. The stress relief fasteners 111 fastening the first endplate 101 to the body 105 extend through the first endplate 101 and into the body 105. The stress relief fasteners 111, according to the present invention, are any fasteners capable of positioning the first endplate 101 and the flange shoes 107 of the first and second flange shoe sets 119 and 121 during the loading of the workpiece, but yield to pressure due to thermal expansion or other forces. Stress relief comes when the fasteners holding the flange shoes 107 yield under appropriate radial stress and the fasteners holding the end flange plate yields to relieve the axial stress. Suitable materials for stress relief fasteners 111 include, but are not limited to, nylon. One or more reservoirs 109 are located on the surface of the first endplate 101. The reservoirs 109 fluidly communicate with a vacuum source via vacuum lines 115. The reservoirs 109 are shown as separate components, but they may be manufactured integral to the first endplate 101.

Figure 2:
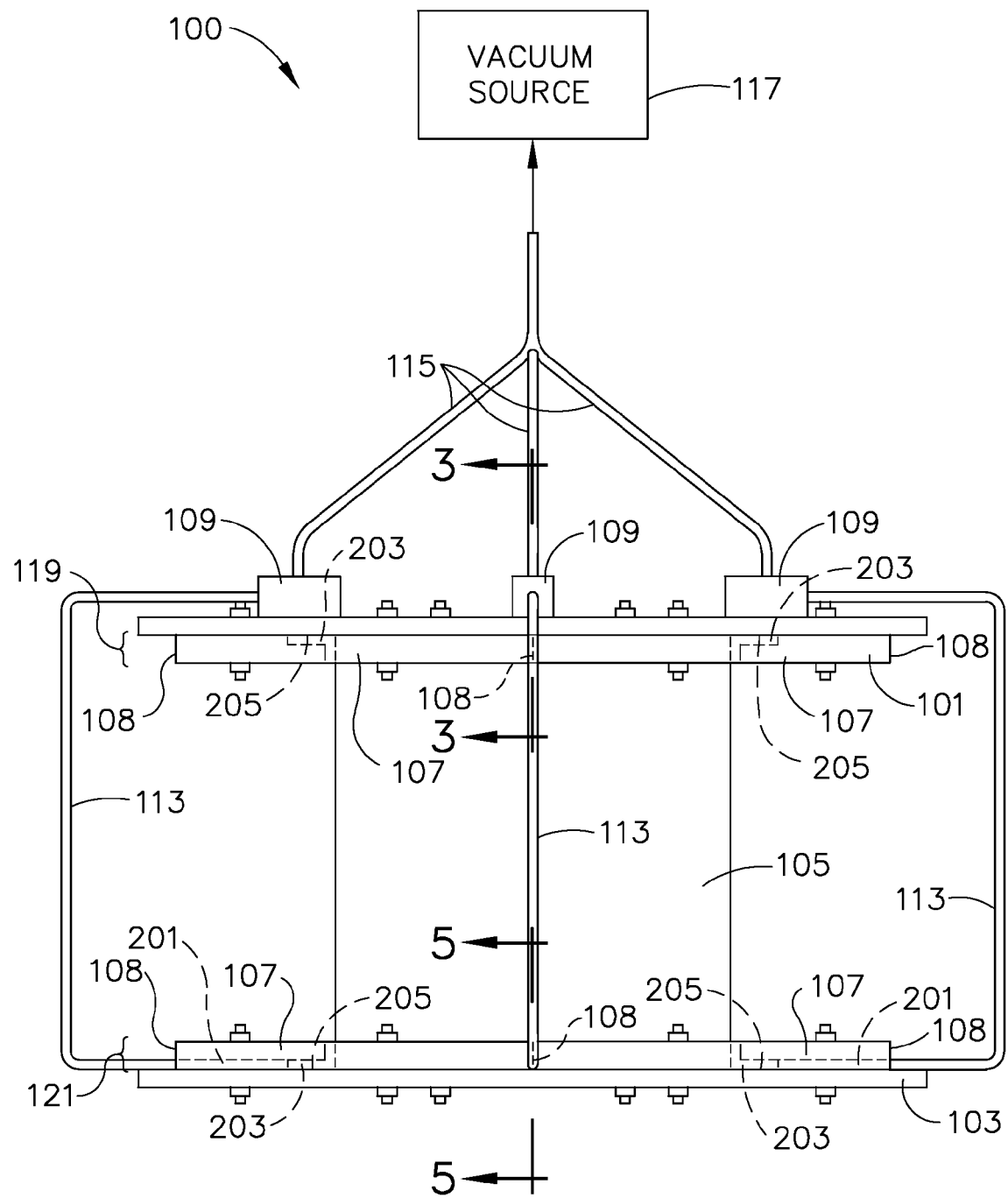
FIG. 2 is a side view of a tool according to the present invention

FIG. 2 illustrates one embodiment of the tool 100 oriented with the first and second endplates 101 and 103 oriented horizontally on the drawing. The orientation shown in FIG. 2 illustrates the embodiment of the invention wherein the tool 100 is loaded into an autoclave with the first endplate 101 oriented substantially horizontally above the second endplate 103 and with the center axis of the body 105 being oriented substantially in the vertical direction. Although this embodiment refers to an autoclave, any chamber having the ability to heat and provide pressure to the tool is suitable for use with the present invention. FIG. 2 shows the flange shoes 107 arranged circumferentially around the body 105. A first set of flange shoes 119 are fastened to the first endplate 101 on the surface nearest to the second endplate 103. A second set of flange shoes 121 are fastened to the second endplate 103 on the surface nearest to the first endplate 101.

A channel 201 is machined in flange shoe junction 108 between individual flange shoes 107 along the surface adjacent to the second endplate 103 to form a fluid connection from the inner surface 205 adjacent to the body 105 to the outer periphery of the flange shoe junctions 108. At the outer periphery of the flange shoe junction 108, a siphon tube 113 is attached and placed in fluid connection with the channel 201 adjacent to the second endplate 103. The siphon tube 113 is in fluid connection with a reservoir 109 adjacent to the first endplate 101. Each reservoir 109 is a hollow chamber that is capable of containing matrix material under vacuum. Each reservoir 109 is in fluid connection with a cavity 203 defined by the flange shoes 107, the lower surface of the first endplate 101 and the inner surface 205 of body 105. The cavity 203 is of sufficient volume to permit insertion of a portion of a workpiece (shown as fiber fabric 301 in FIGS. 3-5). The workpiece is preferably a portion of a reinforcing fiber fabric. The reservoirs 109 are also in fluid connection with a vacuum source 117 through vacuum lines 115. The vacuum source 117 provides vacuum to the reservoirs 109 to draw vacuum on the material in reservoirs 109.

Figure 3:
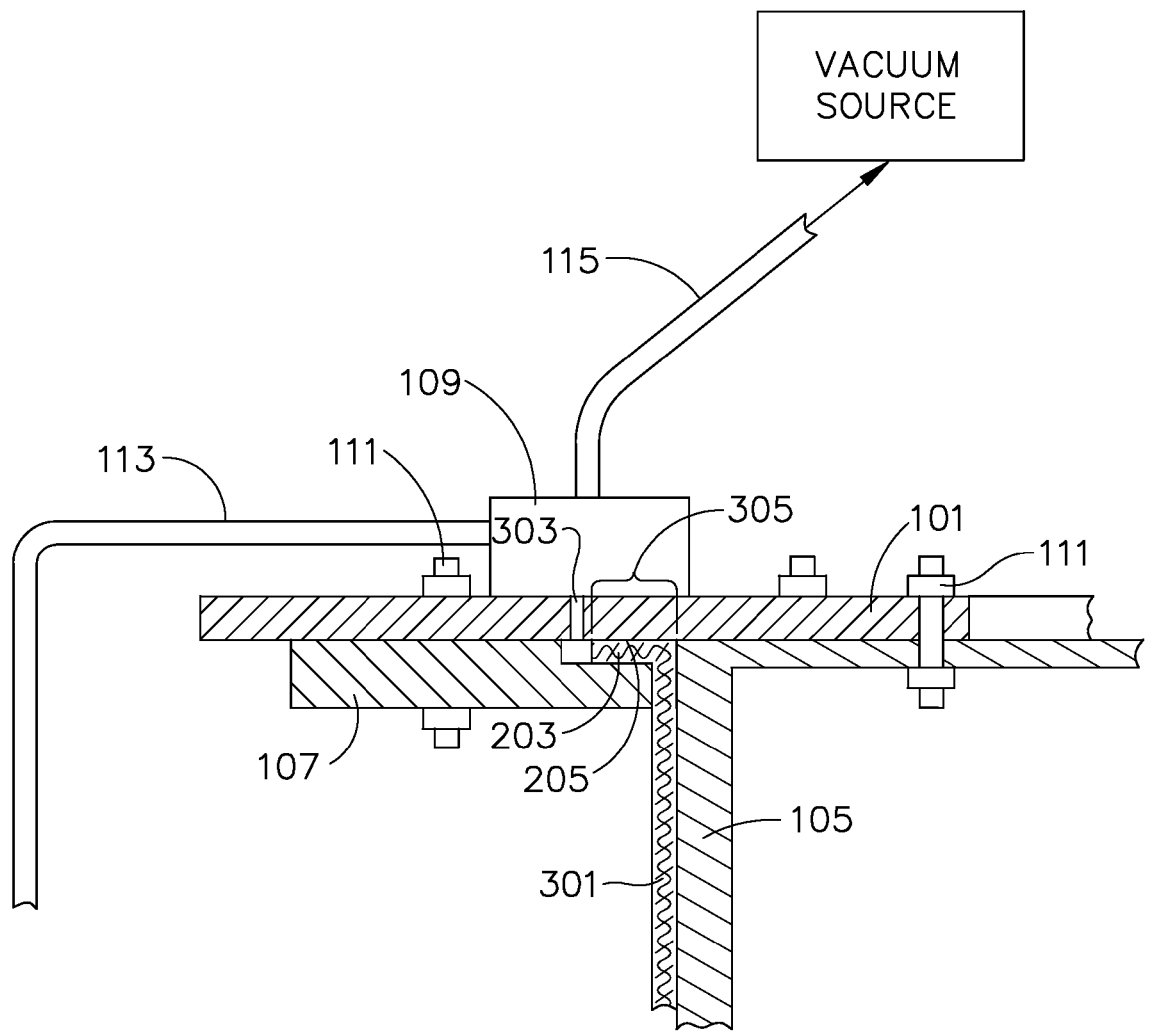
FIGS. 3 and 4 are cross sectional views alternate embodiments of a first portion of a tool according to the present invention.

FIG. 3 shows a cross sectional view representing view 3-3 in FIG. 2. The cross section shown in FIG. 3 provides an enlarged view of a portion of the first endplate 101 wherein the first endplate 101 oriented vertically in the drawing. The first endplate 101 and body 105 are loaded with a fiber fabric preform 301. The fiber fabric preform 301 includes a flange portion 305 that extends from the body 105 along the first endplate 101. Flange shoes 107 are fastened to the first endplate 101 with a stress relief fastener 111. Likewise, the first endplate 101 is fastened to the body 105 with a stress relief fastener 111.

FIG. 3 shows the fiber fabric preform 301 positioned along the body 105 and angled at an angle of about 90° to form a flange shape in the cavity 203 defined by the flange shoes 107, the first endplate 101 and the inner surface 205 of the body 105. Cavity 203 defined by flange shoes 107, first endplate 101 and body 105 is in fluid communication with the reservoirs 109 through a matrix material distribution channel 303. The reservoirs 109 are in fluid communication with at least one vacuum line 115 and at least one siphon tube 113.

Figure 4:
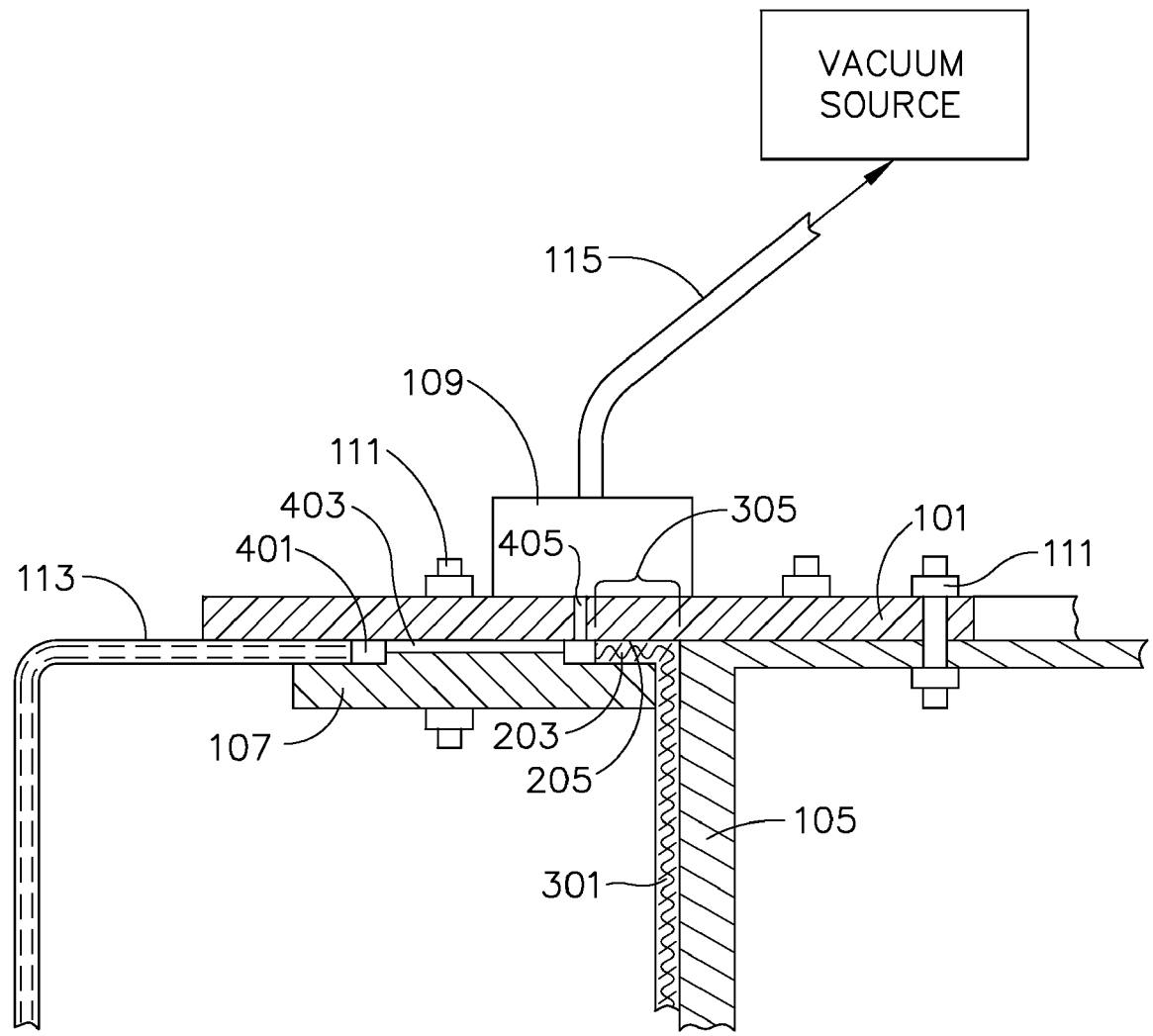

FIG. 4 shows a cross sectional view representing view 3-3 in FIG. 2. The sectional view shows a portion of the composite duct-forming tool 100 having the same arrangement of body 105, flange shoes 107, fiber fabric preform 301, and first endplate 101 as FIG. 3. However, the embodiment illustrated in FIG. 4 has the siphon tube 113 inserted into a siphon tube recess 401 in the flange shoes 107. The siphon tube 113 is in fluid communication with a matrix material distribution channel 403. The matrix material distribution channel 403 extends from the siphon tube 113 to the cavity 203 defined by the flange shoes 107, the first endplate 101 and the inner surface 205 of the body 105. Cavity 203 defined by flange shoes 107, first endplate 101 and inner surface 205 of body 105 is in fluid communication with reservoirs 109 through reservoir channel 405. The reservoirs 109 are in fluid communication with a vacuum source 117 via vacuum line 115.

Figure 5:
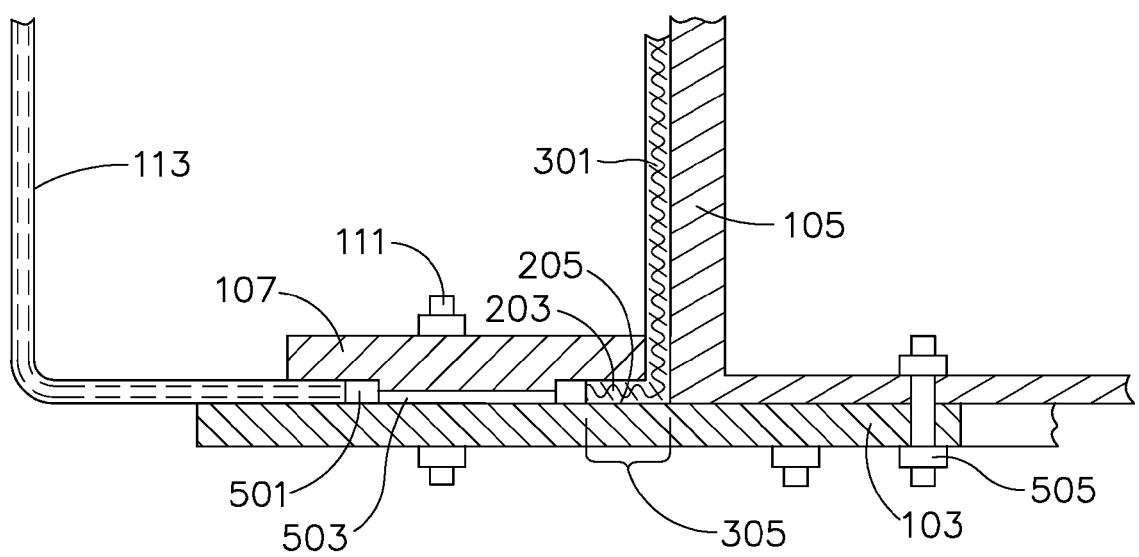
FIG. 5 is a cross sectional view of a second portion of a tool according to the present invention.

FIG. 5 shows a cross sectional view representing view 5-5 in FIG. 2. The cross section shown in FIG. 5 provides an enlarged view of a portion of the second endplate 103 oriented vertically in the drawing, loaded with a workpiece of fiber fabric preform 301. FIG. 5 also shows flange shoes 107 fastened to the second endplate 103 with a stress relief fastener 111. The second endplate 103 is fastened to the body 105 by a second endplate fastener 505. The second endplate fastener 505 is a fastener that does not yield under pressure, like the stress relief fastener 111. The second endplate fastener 505 may be any fastener that does not yield under the stresses generated by the tool 100. In an alternate embodiment, the second endplate 103 and the body 105 may be permanently attached or a machined single piece. In this embodiment, the second endplate 103 is integral to the body 105 and may be machined or cast as a single piece having the body 105 extend from the second endplate 103. Alternatively, the body 105 and the second endplate 103 may be welded together.

The embodiment illustrated in FIG. 5 has the siphon tube 113 inserted into a siphon tube recess 501 in flange shoes 107. The siphon tube 113 is in fluid communication with a matrix material discharge channel 503. The matrix material distribution channel 503 extends from the siphon tube to cavity 203 defined by flange shoes 107, second endplate 103 and inner surface 205 of body 105.

Figure 6:
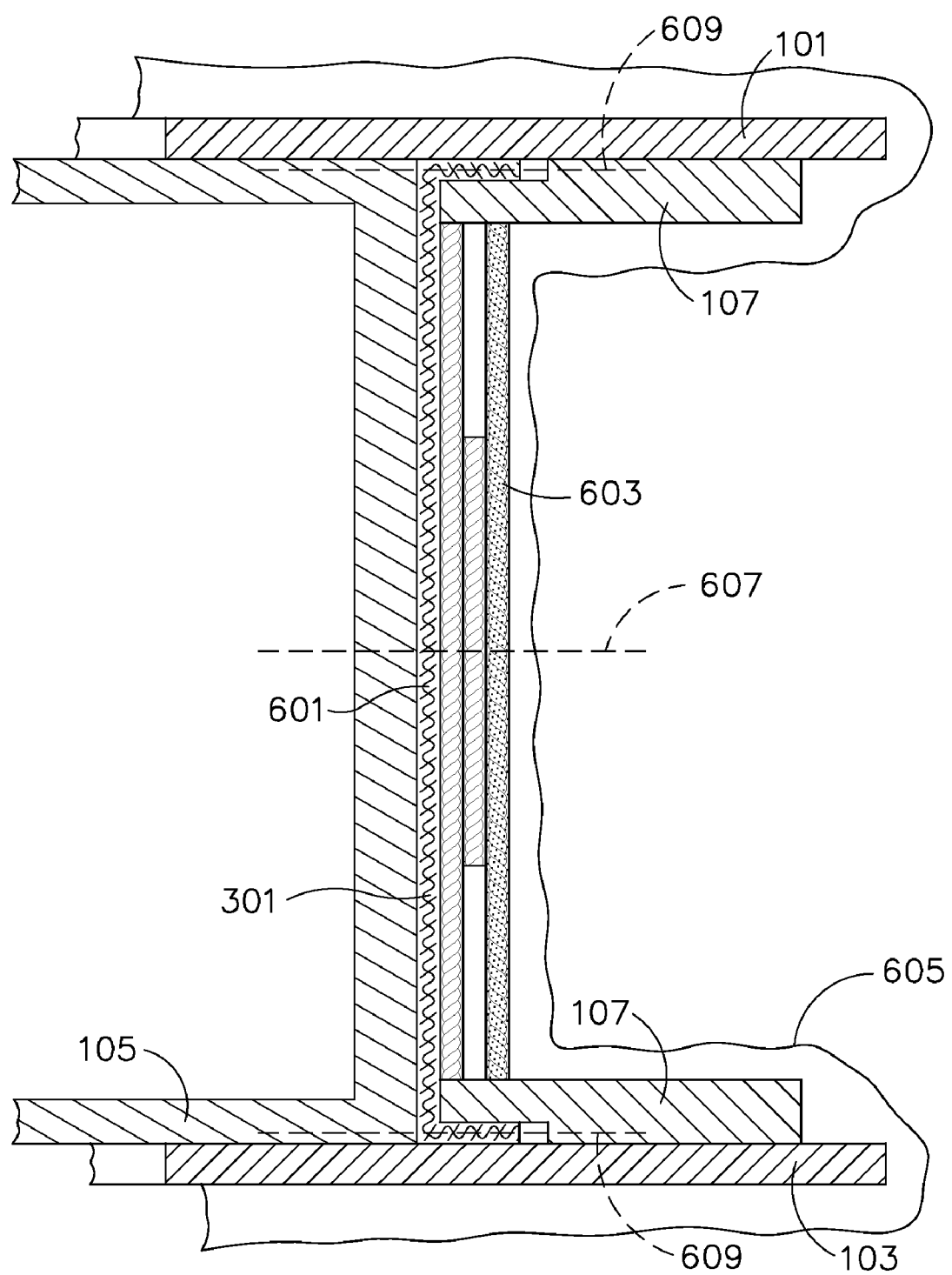
FIGS. 6 to 9 illustrate stages of the composite forming method using a tool according to the present invention.
Figure 7:
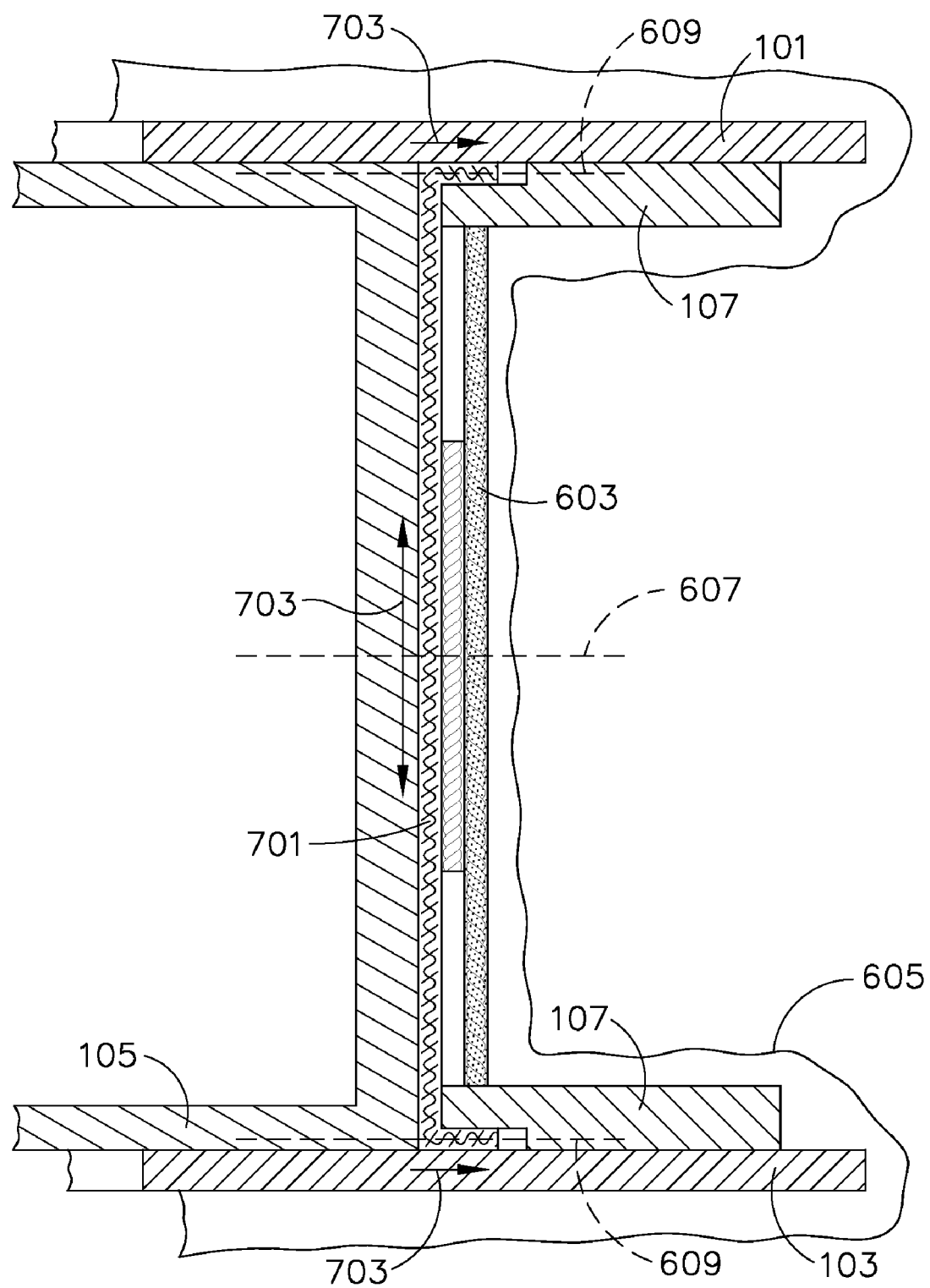
Figure 8:
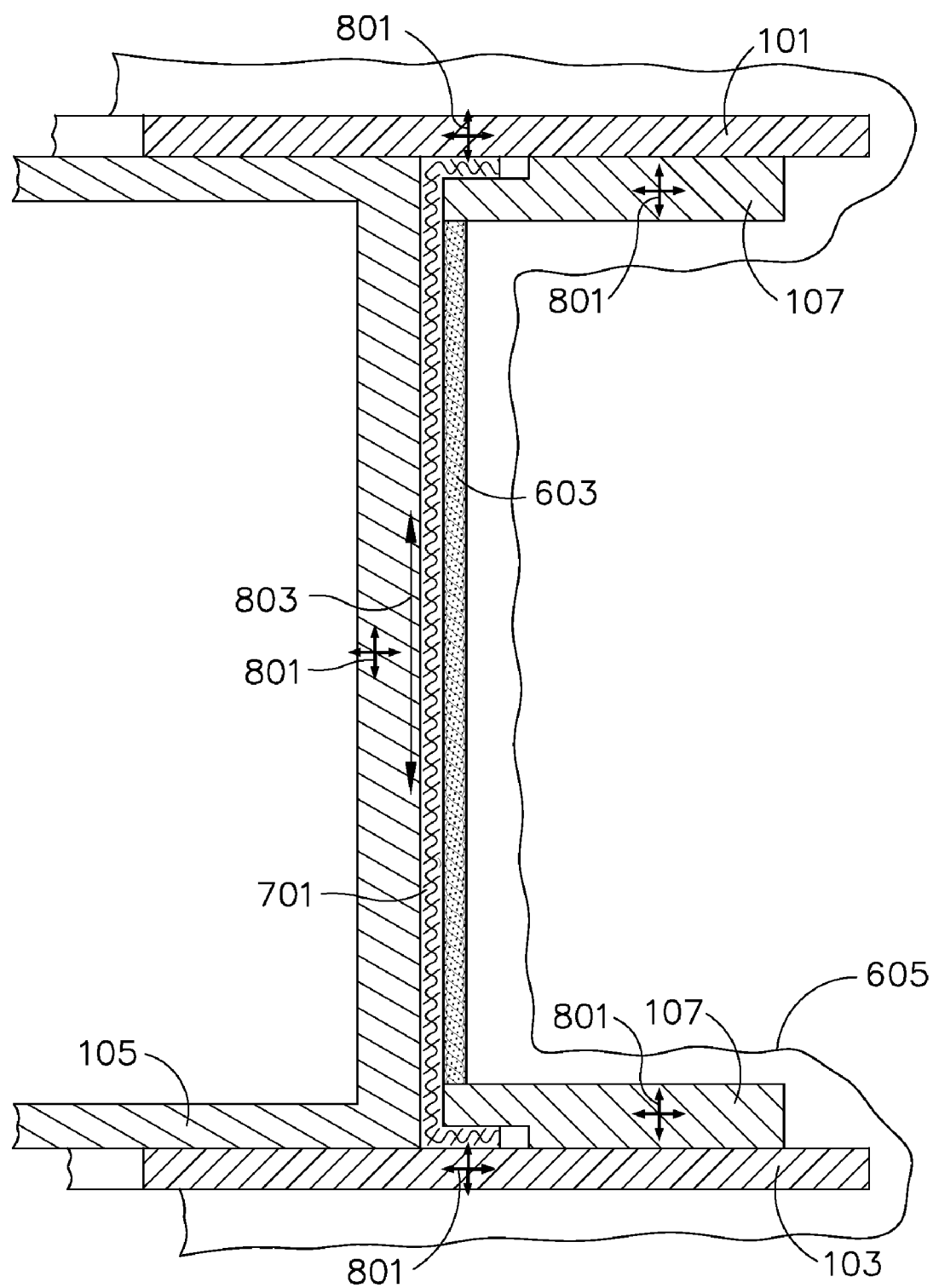
Figure 9:
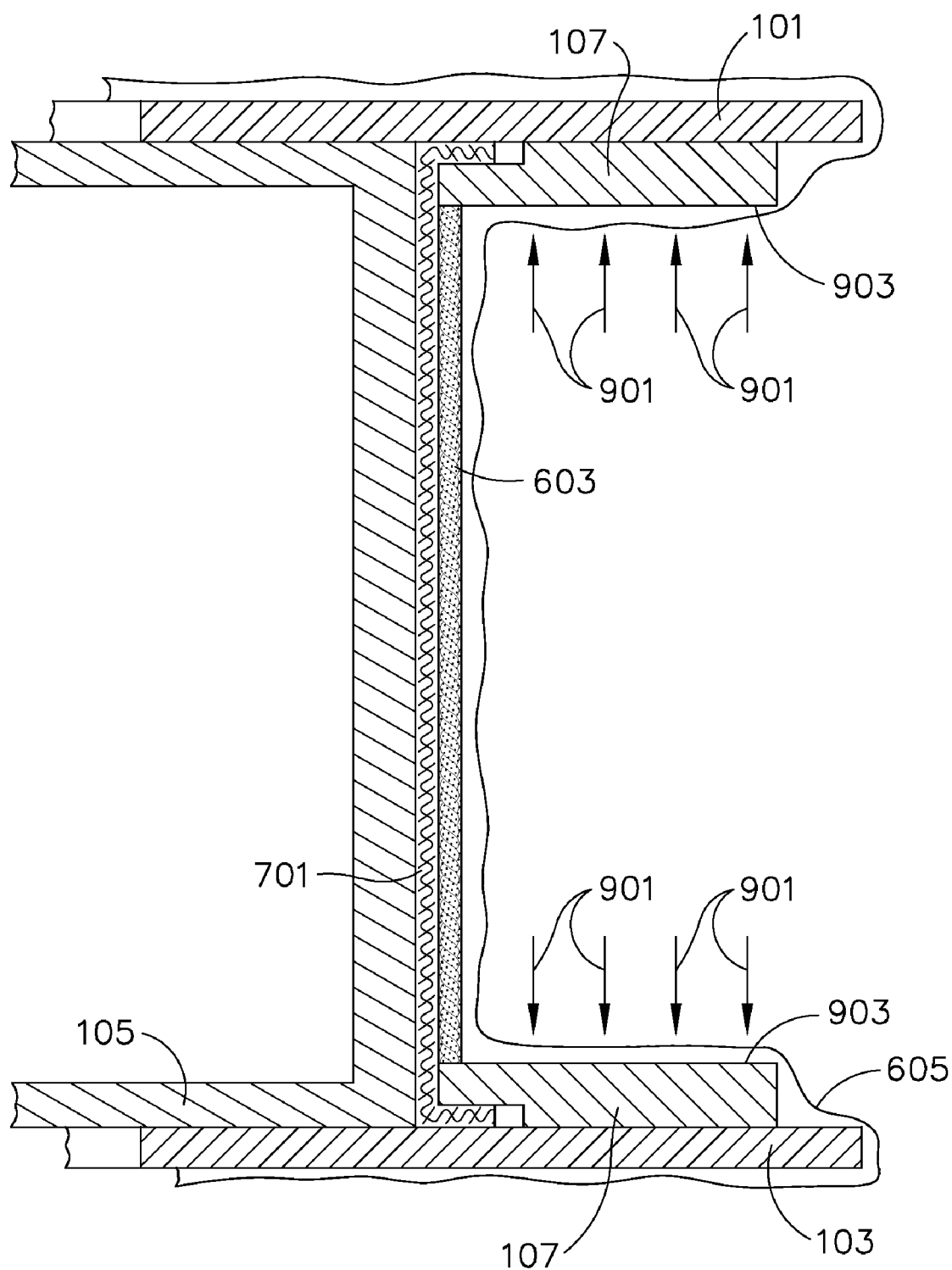

FIGS. 6-9 illustrate the composite duct-forming tool 100 according to the present invention loaded with the workpiece 301 and matrix material 601 to be formed into a composite. FIGS. 6-9 illustrate various stages in the matrix material infiltration and curing process. FIG. 6 illustrates the tool 100 before loading into the autoclave (not shown). FIGS. 7 and 8 illustrate the tool 100 during heating. FIG. 9 illustrates the tool 100 under autoclave pressure. FIGS. 6-9 show a cross section taken radially from the center axis of the cylinder portion of the body 105 of the tool 100 shown in FIGS. 1 and 2. FIGS. 6-9 illustrate the tool 100 having a body 105, a first endplate 101, a second endplate 103, and flange shoes 107, arranged as shown in FIGS. 1 and 2. For illustration purposes, FIGS. 6-9 do not show the stress relief fasteners 111 and 505, the siphon tubes 113, the reservoirs 109, the vacuum lines 115, the matrix material discharge channels 503 or the matrix material distribution and vacuum channels 303, 403 and 405. It is noted that each of the above element are present in the tool 100 loaded into the autoclave, as well as a vacuum membrane or bag 605 surrounding the tool 100.

FIG. 6 shows the tool 100 before loading into the autoclave. The tool 100 is first loaded with a fiber fabric preform 301. On the fiber fabric preform 301, a layer of matrix material 601 is coated on the surface. The matrix material 601 is preferably bulk resin weighed out into discrete portions. Bulk resin is uncured resin that has not been processed into a final form (e.g., sheets or plies) and is capable of being separated into discrete portions. At room temperature, the bulk resin is preferably a pliable solid. The bulk resin is separated into substantially rectangular portions, which are placed on the surface of the fiber fabric preform 301. It is noted that any shape portion that provides resin to the surface of the fiber fabric preform 301 is suitable for use with the invention. After placing the portions onto the surface of the fiber fabric preform 301, the rectangular portions are conformed to the surface shape. The rectangular portions are preferably pliable at room temperature. The rectangular sections of bulk resin may optionally be pre-heated to increase the pliability of the resin to assist in conforming the rectangular portions to the surface shape. A suitable resin may include, but is not limited to, epoxy or polyamide resin. The matrix material 601 is coated onto the surface of the fiber fabric preform 301 so that a greater amount of matrix material 601 (i.e., a greater amount of matrix material per unit of surface area) is coated onto the center 607 of the fiber fabric preform 301 (i.e., the midpoint between the first and second endplates 101 and 103) and a lesser amount (i.e., a lesser amount of matrix material per unit of surface area) is coated on the edges 609 of the fiber fabric preform 301 (i.e., the area adjacent the first and second endplates 101 and 103). Although this embodiment refers to bulk resin, any matrix material capable of forming a reinforced matrix composite may be used with the present invention.

After the tool 100 is loaded with the matrix material 601, an elastomer caul 603 is placed onto the matrix material 601 coated fiber fabric preform 301. The caul 603 is formed from a material that is a barrier to the passage of matrix material 601. Suitable material for the caul 603, includes, but is not limited to, silicone. Any material which will not bond with the matrix material and which can withstand the heat and pressure and is flexible may be used as the material for the caul 603. The caul 603 is positioned so that the matrix material 601 may only travel along the fiber fabric preform 301, into the area adjacent to the first and second endplates 101 and 103 where the matrix material 601 may enter the matrix material discharge channels 503 or the matrix material distribution and vacuum channels 303, 403 and 405, the siphon tubes 113 or the reservoirs 109, as illustrated in FIGS. 1-5. Once the tool 100 is loaded, the loaded tool 100 is placed inside a vacuum bag 605. Tool 100 of the present invention provides a method for manufacturing fiber reinforced matrix composites wherein the process only requires a single vacuum bag 605.

FIG. 7 illustrates the tool 100 and the movement of matrix material 601 when exposed to heat, during heating and holdings steps of a curing cycle. The matrix material 601 upon heating becomes liquid or fluid and begins to infiltrate the fiber fabric preform 301 to create a partially impregnated fiber fabric preform 701. As the matrix material 601 becomes liquid or fluid, the material flows from the center 607 of the fiber fabric preform 301 (i.e., the midpoint between the first and second endplates 101 and 103) in the direction of arrows 703. As the matrix material 601, now a liquid resin, moves from the center 607 of the fiber fabric preform 301 to the outer edges 609, air, volatile gases devolve from the matrix material 601, and other materials, such as impurities or gases trapped in the fiber fabric preform 301, that potentially could cause void space are pushed by the flow of bulk matrix material 601 toward the outer edges 609 of the fabric adjacent to the first and second endplates 101 and 103. Excess matrix material 601, air, volatile gases from the bulk matrix material 601 and other materials that potentially could cause void space flow into the siphon tube 113 and are drawn into either the reservoirs 109 or into cavity 203 defined by flange shoes 107, second endplate 101 and inner surface 205 of the body 105 through the matrix material distribution channel 403, as illustrated in FIGS. 1-5.

FIG. 8 illustrates the tool 100 and partially impregnated fiber fabric preform 701 when exposed to heat, during the heat up and hold steps of the curing cycle. The first endplate 101, second endplate 103, the body 105, and the flange shoes 107 are fabricated from a material that has a greater thermal coefficient of expansion than the partially impregnated fiber fabric preform 701. As a result, during heat-up, as shown in FIG. 8, each of the first endplate 101, second endplate 103, the body 105, and the flange shoes 107 expand in all directions as shown by arrows 801. The partially impregnated fiber fabric preform 701 expands very little in comparison to the body 105. The difference in the amount of thermal expansion of the tool 100 against the partially impregnated fiber fabric preform 701 results in a tensional force shown by arrows 803 that acts to pull the partially impregnated fiber fabric preform 701 taut. Fiber fabric preforms 701 that are pulled taut before matrix material curing provide uniform materials with high strength substantially free of waves and wrinkles.

FIG. 9 illustrates the tool 100 when exposed to pressure, during the heat up and hold steps of the curing cycle. Flange shoes 107 are fabricated with a large surface area 903 in the plane parallel to the first and second endplates 101 and 103. As the pressure in the autoclave is increased during the curing cycle, the force of the pressure of the autoclave atmosphere shown by arrows 901 on the vacuum bag 605 and flange shoes 107 surface is multiplied by the surface area 903 of flange shoes 107. Flange shoes 107 surface is greater in surface area 903 than the fiber fabric preform 701 forming the flange-like shape so as to add substantial position holding force from autoclave pressure. The pressure holds the fiber fabric preform 701 in place while the body 105 expands and pulls the fiber fabric preform 301 taut.

Figure 10:
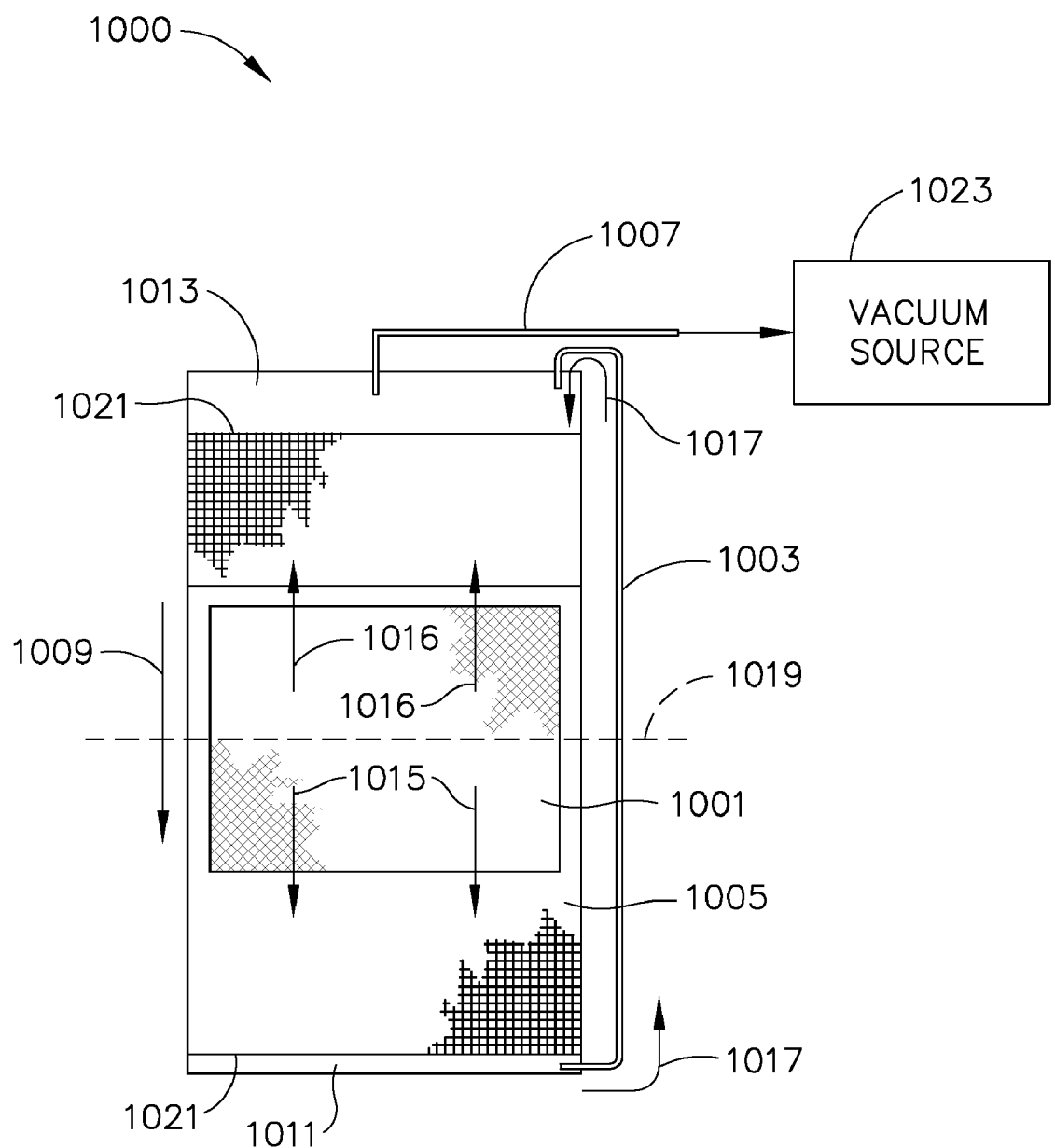
FIG. 10 is a schematic view of a matrix material distribution system according to the present invention.

FIG. 10 illustrates a matrix material distribution system 1000 according to the present invention for fabricating a fiber-reinforced matrix composite (not shown). A fiber fabric preform 1005 is loaded with matrix material 1001, wherein a greater amount of matrix material 1001 is positioned in the center 1019 of the fiber fabric preform 1005 than at the edges 1021.

In order to form the fiber reinforced matrix composite (not shown) according to the present invention, the fiber fabric preform 1005 coated with the matrix material 1001 is mounted vertically and the system 1000 is exposed to vacuum through vacuum line 1007 and sufficient heat to make the matrix material 1001 viscous. The movement of the matrix material 1001 within the fiber fabric preform 1005 is illustrated as arrows 1015 and 1016 in FIG. 10. Initially, the viscous matrix material 1001 travels in two directions shown by arrows 1015 and 1016. A larger portion of the matrix material 1001 (shown as arrow 1015) travels in the direction of gravity (arrow 1009) and a smaller portion (shown as arrow 1016) is drawn in a direction toward the vacuum line 1007. The vacuum line 1007 is fluidly connected to vacuum source 1023.

The matrix material 1001 traveling in the direction of gravity (shown by arrow 1009) gathers in a collection well 1011. The collection well 1011 fluidly communicates with a distribution well 1013 through a siphon tube 1003. The distribution well 1013 is a chamber adjacent to the vacuum line 1007 and the upper edge of the fiber fabric preform 1005. Matrix material 1001 is drawn from the collection well 1011 to the distribution well 1013 by suction from the vacuum line 1007, as shown by arrows 1017. The system is self-regulating and continues until the matrix material 1001 throughout the fiber fabric preform 1005 material is substantially uniformly distributed throughout the fiber fabric preform 1005. The system is self-regulating in that siphon tube 1003 continues to draw matrix material 1001 from the collection well 1011 to the distribution well 1013 as long as the pressure differential across the matrix material 1001 impregnated fiber fabric preform 1005 is greater than the pressure differential across the siphon tube 1003. Once the pressure across the siphon tube 1003 is equal to the pressure across the impregnated fiber fabric preform 1005, the matrix material 1001 is no longer drawn from the collection well 1011 to the distribution well 1013. The resultant matrix impregnated fiber fabric preform 1005 contains substantially uniform distribution of matrix material 1001. The impregnated fiber fabric preform 1005 is further heated to complete the curing cycle and to produce a fiber reinforced matrix composite.

Figure 11:
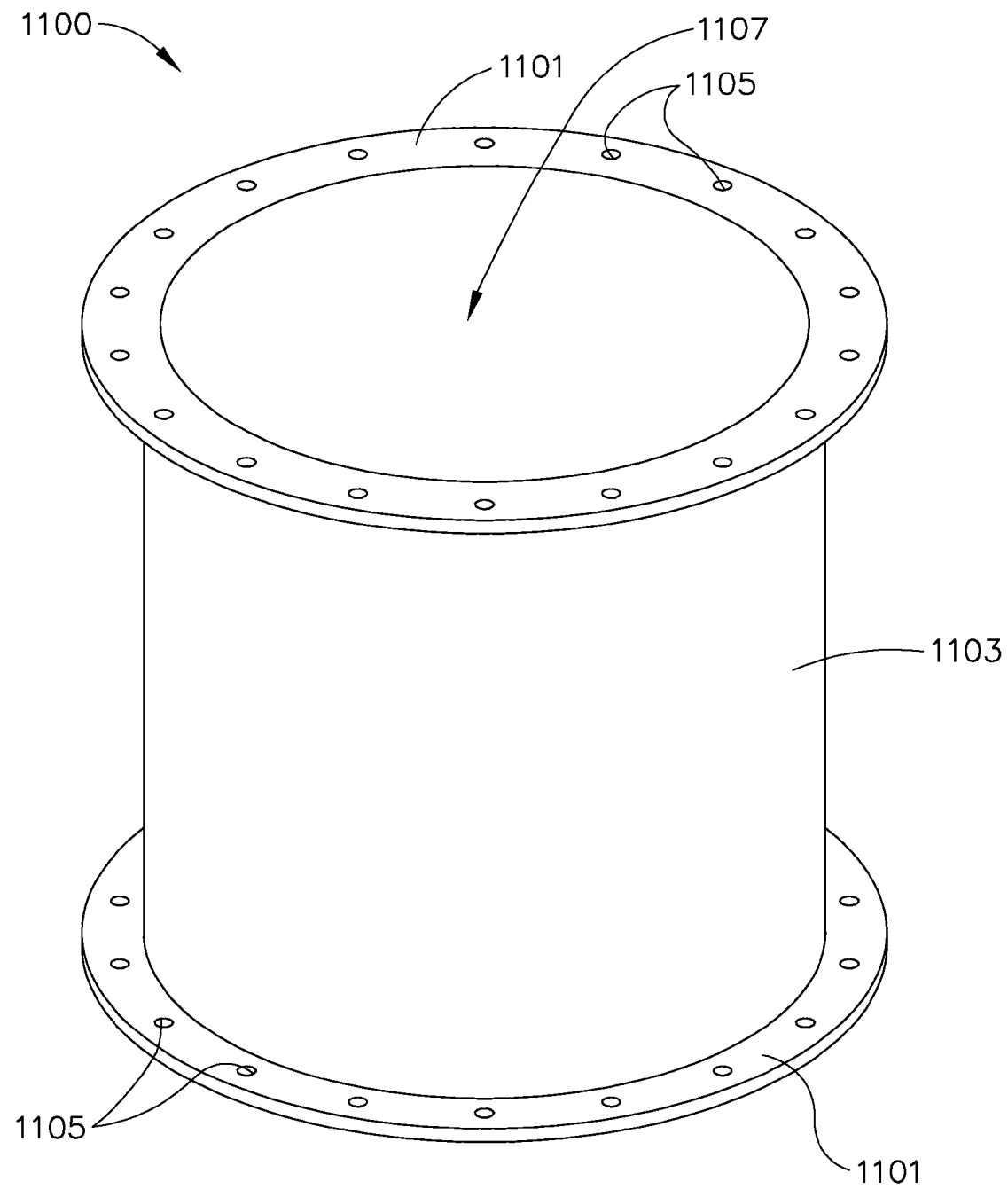
FIG. 11 is a perspective view of a composite containment duct according to the present invention.

FIG. 11 illustrates a composite containment duct 1100 according to the present invention. Composite containment duct 1100 is the product made by tool 100 (see FIGS. 1-2). Composite containment duct 1100 is a single piece having a duct body 1103 and integral high strength flanges 1101. Additionally, holes 1105 are machined into the flange 1101 to allow fasteners to attach the composite containment duct 1100 to other bodies. Flanges 1101 provide a surface to which composite containment duct 1100 may be attached to another body. Another body may include a second composite containment duct 1100. The attachment of two containment ducts has the advantage of additional length and the ability to create ducts that have converging and diverging duct areas. In this embodiment, a composite containment duct 1100 has a tapered duct body 1103, wherein the diameter of the duct at one flange is larger than the diameter of the duct at the other flange. In some containment duct applications, a containment duct having both a converging portion and a diverging portion is desirable. To form a containment duct 1100 that converges in one portion and diverges in another portion, a tapered containment duct 1100 is attached by the flanges at the end of the containment duct having the smaller duct diameter to a second substantially identical tapered containment duct 1100. Attachment of the flanges at the smaller duct diameter permits a duct that diverges from one end of the combined containment duct to the center and diverges from the center of the combined containment duct to a second end of the combined containment duct. The flanges may also be fastened to a portion of a gas turbine engine (not shown). In one embodiment, the flanges may be fastened to the gas turbine engine so that the fan blades (not shown) of the gas turbine engine are positioned in the interior portion 1107 of the duct body 1103 substantially along the outer periphery of the path of the fan blade tips to provide containment of the fan blades.

One embodiment of the present invention includes providing a tool 100 having a surface having the shape of the desired composite. In one embodiment of the invention, the body 105 is substantially the shape of a cylindrical containment duct. In this embodiment, the cylindrical duct preferably tapers inward toward the center axis of the body 105. The shape of the finished reinforced matrix composite is not limited to substantially cylindrical shapes. Any shape having flanged outer edges may be fabricated by the method of the present invention. Suitable shapes, in addition to the substantially cylindrical ducts, include, but are not limited to, ducts having complex cross-sectional geometry (e.g., rectangular ducts, triangular ducts or oval ducts), flat panels, and other complex shapes having wall-structures. Additionally, wall-structures having features may be formed using the tool 100 and method of the present invention. The tool 100 of the present invention, likewise, has body 105 of substantially the same shape as the finished composite.

The tool 100 is fabricated from a material having a coefficient of thermal expansion greater than the coefficient of thermal expansion of the fiber fabric preform 301. One criteria for selection of the tool material is the amount of tension desired in the fiber fabric preform 301. The greater the tension desired, the greater the coefficient of thermal expansion should be for the tool material. The less tension desired, the less the coefficient of thermal expansion should be for the tool material. Preferably, the tool 100 is fabricated from a metallic material. Fibers that make up the fiber fabric preform 301 have a relatively low coefficient of thermal expansion when compared to metallic materials. Therefore, when the tool 100 is exposed to heat, the tool material expands at a rate much faster than the rate of expansion for the fiber fabric preform 301. The tension created by the expansion of the tool 100 in relation to the expansion of the fiber fabric preform 301 acts to pull the fiber fabric preform 301 taut and substantially aligns the fibers to produce a high strength, uniform composite substantially devoid of waves and wrinkles. The greater the thermal expansion of the tool 100 in relation to the fibers, the greater the tension created. Suitable materials for fabrication of the tool 100 include, but are not limited to, aluminum and steel.

The reinforcing material for the composite matrix is preferably woven fiber fabric. The fiber fabric is a preform capable of forming a reinforced matrix composite. A variety of fibers is suitable for use in composite matrix materials. The fibers may be woven or plied upon each other to form a composite preform. In one embodiment of the invention, the fiber fabric preform 301 is a triaxial woven fabric of strand bundles. The triaxial woven fabric has one strand bundle running axially, with another stand bundle oriented at about +60° from the bundle in the axial direction and a third strand bundle oriented at −60° from the bundle in the axial direction. Suitable fibers for forming the fiber fabric preform 301 include, but are not limited to, carbon, graphite, glass and polyamide fibers. The fiber fabric preform 301 is preferably dry. By dry, it is meant that there is no matrix material impregnated into the fiber fabric prior to loading the fiber fabric preform 301 onto the tool 100.

The matrix material 601 for use in the reinforced matrix composite of the present invention is a curable material that forms a high strength matrix composite when reinforced with reinforcing fibers. Suitable matrix materials 601 for use in the reinforced composite material of the present invention include, but are not limited to, epoxy and polyimide.

The process of the present invention includes loading the tool 100 with the material for forming the reinforced matrix composite. The tool 100 is first loaded with the material for reinforcement of the matrix in the finished composite material. The reinforcing material is preferably a fiber fabric preform 301. The fabric of fibers is preferably a fabric having a woven structure. Preferably the woven structure has three independent bundles of fibers woven so as to have orientations of 60° angles to each other. The fibers are preferably graphite fibers. The fabric may include, but is not limited to triaxial graphite fiber. A preferred fiber fabric preform 301 includes the triaxial graphite fiber with a 24 k (i.e., 24,000 strand) bundle tow in the axial direction and two 12 k (i.e., 12,000 strand) bundles in the +60° direction from the tow in the axial direction and two 12 k bundles in the −60° direction from the tow in the axial direction.

In one embodiment of the invention, the tool 100 preferably has a preselected geometry of a spool. The spool shape includes a substantially cylindrical body 105 affixed to two endplates 101 and 103. At least one of the two endplates 101 and 103 is fastened to the body and is detachable. In this embodiment of the present invention, the tool 100 is oriented with the endplates 101 and 103 positioned having their planar surfaces oriented vertically in order to load the tool 100 with the reinforcing fiber material. The graphite fiber fabric preform 301 is positioned around the body 105 of the spool. A flange portion 305 of the preform is positioned along the length of each of endplates 101 and 103. The flange portion 305 of the fabric extending along the first and second endplates 101 and 103 forms a flange-like shape.

Once the fiber fabric preform 301 is loaded onto the tool, a plurality of plates (i.e., flange shoes 107) are arranged abutting one another along the periphery of the tool 100 along the endplates 101 and 103. A first set of plates is adjacent to the first endplate 101. A second set of plates is adjacent to the second endplate 103. The plates are preferably metallic and have at least one surface having a surface area 903 greater than the surface area of the length of material extending along the length of the endplates 101 and 103. The plates are positioned to provide support for the fabric material extending along the endplates 101 and 103 and forming the flange portion 305 and are fastened to the endplates with stress release fasteners 111. Each stress release fastener 111 is a fastener that positions the shoe at room temperature prior to the curing cycle and releases the flange shoes 107 from the first and second endplates 101 and 103 during the heat up portion of a curing cycle. As the tool expands axially, the stress release fasteners are designed to yield rather than prevent movement of the tool. So, the fastener maintains the flange shoes 107 in position, against the flange, but yields to allow the tool to expand axially.

In one embodiment of the invention, one or more of the plates are provided with channels 201, 303, 403, 405, 503 to facilitate circulation of excess resin. The channels 201, 303, 403, 405, 503 permit passage of matrix material 601 from the area of the tool carrying the matrix coated fibers to outside the area of the tool carrying the matrix coated fibers. The channels 201, 303, 403, 405, 503 allow excess matrix material 601 to pass into or out of the area of the tool 100 holding the fiber fabric preform 301. When the tool 100 is positioned to have the first and second endplates 101 and 103 aligned horizontally with respect to the autoclave during loading, the second endplate 103 at the bottom includes one or more openings that are fluidly communicate to the area of the tool providing the vacuum, preferably at or near the top first endplate 101 of the tool. The tool 100 includes reservoirs 109 positioned on the top of the first endplate 101 when the first and second endplates 101 and 103 are aligned horizontally. In this embodiment, the vacuum fluidly communicate with reservoirs 109, as well as fluid communication with openings in the flange shoes 107. The fluid communications act as a siphon allowing excess matrix material 601 that pools because of gravity to travel to the area of the tool having suction, thereby providing matrix material 601 to areas of the fiber having less matrix material 601, including the areas at or near the first endplate 101. The siphon tubes 113 allow a uniform distribution of the matrix material 601 across the fiber fabric preform 301.

The tool 100 is then covered with matrix material 601, preferably in bulk form. The matrix material 601 is loaded onto the fiber fabric preform 301 by coating matrix material 601 directly onto the surface of the fiber fabric preform 301. The placement of the matrix material 601 onto the reinforcing fiber fabric preform 301 includes placing a preselected amount of matrix material 601 onto the surface of the fiber fabric preform 301. The preselected amount of matrix material 601 is an amount sufficient to impregnate the preform. The matrix material 601 is stacked or laid up on the surface in discrete portions. Once the matrix material 601 is placed onto the surface of the fiber fabric preform a barrier caul 603 is placed over the matrix material 601 to hold it in place until the tool is loaded into the autoclave. During the heating phase, the stacked or laid up matrix material layers (i.e. lay up) will melt and infiltrate into the fiber fabric preform 301. Force applied to the matrix material 601 from the autoclave pressure on the caul 603 will assist the matrix material 601 in penetrating the fiber fabric preform 301 and in spreading outward across the fiber fabric preform 301. The molten matrix material mass forms a wavefront as it flows across the fiber fabric preform 301 that forces the gaseous pockets out of the preform before the resin begins to set up and cure. In particular, the wavefront pushes out air, volatile material from the bulk matrix material 601, such as solvent vapor, and other gases that are capable of forming voids, such as impurity gas pockets remaining in the matrix material or in the fiber fabric preform 301. The placement of the matrix material 601 also permits the impregnation of preforms having complex shapes. Complex shapes include preforms having more complex geometric features than a flanged cylinder. Features may be present in preforms having more than one pathway for matrix material flow prior to curing. For example, reinforced matrix composite parts may include planar wall portions having attached stiffener or insert features.

In one embodiment of the invention, the matrix material 601 is resin separated into rectangular block sections, positioned onto the surface, and conformed to the surface of the fiber fabric preform. A suitable resin may include, but is not limited to, epoxy and/or polyimide. The matrix material 601 is coated onto the surface of the fiber fabric preform 301 so that a greater amount of matrix material 601 is coated onto the center 607 of the fiber fabric preform 301 (i.e., the midpoint 607 between the first and second endplates 101 and 103, as illustrated in FIG. 6) and less is coated on the edges 609 of the fiber fabric preform 301 (i.e., the area adjacent the first and second endplates 101 and 103, as illustrated in FIG. 6).

Once the fiber fabric preform 301 is coated with the matrix material 601, the matrix material coated fiber fabric preform 301 is coated with an elastomeric sheet (i.e., caul 603). The caul 603 acts as a barrier to isolate and control the flow of matrix material into the fiber fabric preform 301. After the caul 603 is positioned, the caul 603 is sealed against the tool 100 to form a barrier and prevent flow of matrix through the caul 603, but allow flow along the fiber fabric preform 301.

Once the caul 603 has been placed around the fabric-matrix material and sealed, the tool 100, including caul 603 and matrix material 601 coated fiber fabric preform 301, is placed inside a vacuum envelope or bag 605. A vacuum source 117 is connected to the vacuum bag 605 and the tool 100 to provide reduced pressure (i.e., vacuum). The vacuum source 605 preferably draws a vacuum of up to about 28 inches of mercury and more preferably up to about 30 inches of mercury. The vacuum provides a driving force for distribution of the matrix material 601 during the heat up and curing phases of the process. The vacuum is drawn on the tool 100 through the vacuum bag 605. The loaded tool 100 is then heated. While the tool 100 is being heated, a positive pressure of gas external to the vacuum bag 605 is provided. The positive pressure is preferably provided with an inert gas, such as nitrogen. During the heating and holding cycle the positive pressure is preferably increased to pressures of up to about 200 lb/in$^2$ or more, and preferably up to about 220 lb/in$^2$ or more. When loaded into the autoclave, the tool 100 is preferably oriented with the plane of the first and second endplates 101 and 103 aligned horizontally with respect to the autoclave.

In order to form the composite, the caul-covered fiber fabric preform 301 loaded with matrix material 601 is heated. The matrix material 601 becomes viscous at higher temperatures and flows into (i.e., impregnates) the fiber fabric preform 301. Simultaneously, the tool 100 on which the fiber fabric preform 301 is loaded expands due to thermal expansion. Since the fiber fabric preform 301 experiences little or no thermal expansion, the fiber fabric preform 301 is pulled taut, providing at least some tension and alignment of fibers in the fiber fabric preform 301. The tool 100 and the matrix coated fiber fabric preform 301 is then heated to a temperature to permit the matrix material to fully impregnate the fiber fabric preform 301. After the fiber fabric preform 301 is substantially impregnated, the tool 100 and fiber fabric preform 301 are heated to a curing temperature, and is held at the curing temperature until the fiber reinforced matrix composite is cured. The method includes at least the following steps: a first heating step, a first holding step, second heating step, a second holding step and a cooling step. The temperature is slowly increased to the first holding temperature. A suitable rate of temperature increase includes but is not limited to range of from about ½° F./min to about 1° F./min. The temperature and time for the first holding step is sufficient to allow the matrix material to infiltrate the reinforcing fibers. A suitable temperature for the first holding step includes, but is not limited to the range of from about 300° F. to about 325° F. Suitable temperatures for the first holding step include, but are not limited to about 310° F. The temperature and time for the second holding step is sufficient to cure the matrix material. A suitable temperature for the second holding step includes, but is not limited to the range from about 350° F. to about 375° F. Suitable temperatures for the second holding step include, but are not limited to about 360° F. Once cured, the reinforced matrix composite is slowly cooled to room temperature.

During the heating steps, the heating gases of the autoclave are distributed across the tool 100 to provide uniform heating of the matrix impregnated fiber fabric. Preferably, the body 105 is hollow and/or has an interior surface, opposite the surface on which the fiber fabric preform 301 is positioned. In this embodiment, the interior surface is exposed to the heating atmosphere to heat the fiber fabric preform 301 and matrix material 601 through the body 105. In a preferred embodiment as shown in FIG. 1, the tool body is hollow and substantially cylindrical in shape. The exterior (i.e., the surface on which the fiber fabric preform 301 is positioned) and the interior of the cylinder are exposed to the heating atmosphere through the vacuum bag 605. The inlet to the hollow portion of the cylinder may include a diffuser to uniformly distribute the heating atmosphere. The heating atmosphere distributes the heat uniformly across the matrix impregnated fiber fabric 701 to uniformly cure of the reinforced composite matrix.

During the heating and vacuum cycle, the caul 603 permits the matrix material 601 to travel either in the direction toward the vacuum or in the direction of gravity. More matrix material 601 travels in the direction of gravity than in the direction of the vacuum. The openings in the flange shoes 107 permit excess matrix material to exit the portion of the tool 100 holding the fiber. When the tool 100 is positioned with the first and second endplates 101 and 103 aligned horizontally, the endplate at the bottom (i.e., second endplate 103) includes one or more openings 201 that are fluidly connected to the area of the tool 100 providing the vacuum at or near the reservoirs 109. The area of the tool 100 providing the vacuum is preferably at or near the top endplate (i.e., first endplate 101) of the tool 100. In one embodiment, the tool 100 includes reservoirs 109 positioned on the top of the first endplate 101 when the first and second endplates 101 and 103 are aligned horizontally. In this embodiment, the vacuum source 117 is connected to the reservoirs 109, as well as the fluid connection to the openings in the flange shoes 107. The fluid connections act as a siphon allowing excess matrix material that pools because of gravity to travel to the area of the tool 100 having suction and providing matrix material to the area of the fiber having less matrix material 601.

As the tool 100 is heated, it thermally expands. The tool 100 is made of a material that expands at a rate in excess of the rate of expansion of the fiber fabric preform 301 and matrix material 601. Therefore, as the tool 100 expands, the fiber fabric preform 301 expands at a significantly lesser rate and is pulled taut by the expanding tool 100, creating pre-stressed fiber reinforcement. Once the matrix material 601 has been substantially distributed and cured at the larger tool surface area 903, the tool 100 is then permitted to cool down to ambient temperatures. The tool 100 material thermally contracts with the falling temperature. However, the fiber consolidated with matrix material, which was pulled taut and cured at the size of the tool 100 surface at the higher temperature, thermally contracts at a significantly lesser rate. As the tool 100 material cools, the fiber consolidated with matrix material 601 exerts a force on at least one of the first and second endplates 101 and 103 because the surface of the cured reinforced matrix material 601 at lower temperatures is larger than the tool surface at lower temperatures. The at least one first and second endplate 101 and 103 is allowed to move and the fasteners holding the at least one of the endplates (i.e., first endplate 101) yield, allowing the endplate to be moved as the body of the tool 100 expands. Thus, the yielding of the fasteners 111 does not allow the flange assembly to restrain the body of the tool 100. Once the cycle is complete and reinforced bulk matrix material 601 having the prestressed reinforcing fibers are cured and cooled, the reinforced bulk matrix material 601 is removed from the tool 100 and trimmed, if necessary. Also, if necessary due to the geometry of the finished part, the body 105 may be disassembled to facilitate removal of the cured, reinforced matrix composite part. The fasteners 111 are disposable and are not reused.

The various surfaces of the tool 100 that come in contact with the matrix material 601 may optionally be coated with a release film, such as polytetrafluoroethylene. The release does not stick to the tool components and facilitate easy removal of the finished part. For example, the body 105, the first and second endplates 101 and 103, the flange shoes 107, and/or the caul 605 may be coated with polytetrafluoroethylene.

In alternate embodiment of the present invention, a pre-impregnated fiber fabric preform 301 is loaded onto the tool 100 of the present invention. Pre-impregnated fiber fabric preform 301 is fabric that is loaded with uncured matrix material 601 prior to being loaded onto the tool 100 of the present invention. Flange shoes 107 are positioned on the tool 100 and adjacent to the pre-impregnated fiber fabric preform 301. Flange shoes 107 for use with pre-impregnated fiber fabric preform 301 additionally have rails, guides or a similar mechanism, to guide flange shoes 107 displacement when autoclave pressure is applied. As in the embodiment having the fiber fabric preform 301 that is not pre-impregnated with matrix material 601, flange shoes 107 are greater in surface area than the fiber fabric preform 301 in the flange portion 305 to add substantial position holding force from autoclave pressure. As the tool 100 expands during cure cycle heat up, it pulls the fibers of the fiber fabric preform 301 taut over the flange shoes 107 radius. The rails, guides, or similar mechanism, are positioned to permit the flange shoes 107 to only allow force on the fabric once the tool 100 has expanded to an extent corresponding to heat sufficient to make the matrix material 601 in the pre-impregnated fiber fabric viscous. Once the matrix material 601 is viscous, the flange shoes 107 are permitted to exert force on the fiber fabric preform 301 and pull the fiber fabric taut. As in the embodiment with the dry fiber fabric, pulling the fiber fabric taut creates a pre-stressed fiber reinforced matrix composite. The tool 100 and finished product cool down and the tool 100 thermally contracts but the finished reinforced matrix composite does not contract as much. Flange shoes 107 and the first endplate 101 are fastened with stress relief fasteners 111. Relief comes when the stress relief fasteners 111 holding the flange shoes 107 give under appropriate radial stress and the stress relief fasteners 111 holding the first endplate 101 gives to relieve the axial stress.

One embodiment of the invention includes a composite containment duct 1100 having less than or equal to 2.5% void space. The composite containment duct 1100 preferably has less than 2.0% void space and most preferably less than 1% void space.

The composite containment duct 1100 according to the present invention has improved containment properties. One embodiment of the present invention is a graphite fiber-epoxy matrix composite containment duct 1100. The graphite-fiber epoxy matrix composite of the present invention has the properties of having high strength, including strong flanges, being lightweight and successfully passing a blade-out test. A blade-out test is a test wherein a gas turbine engine is mounted with a full set of fan blades and a containment duct around the periphery of the blade path. The fan blades are subjected to rotational speeds equivalent to the rotational speeds achieved during aircraft takeoff. One or more blades are ejected from the mounting and are allowed to impact the containment duct. A successful blade-out test holds the blade inside the containment duct. The method of the present invention is particularly suitable for fabrication of turbine airfoil components for gas turbine engines. In particular, the method of the present invention is suitable for the fabrication of containment ducts, such as fan casings, which withstand a blade-out test.

The method and tool 100 of the present invention is capable of fabricating large parts. The size of the part is slightly less than the size of the surface of the tool 100. The tool 100 and method of the present invention are particularly suitable for fabrication of parts having large wall-structures, including cylindrical parts having a diameters of about 5 feet or greater, including cylindrical parts having a diameter of about 10 feet. In one embodiment, the tool of the present invention may create a cylindrical part having a diameter of about ten feet or greater that maintain substantially uniform matrix distribution and the low void content.

The flanges 1101 of the containment duct 1100 of the present invention have high strength. One contributing factor for high strength is the fact that the flanges 1101 are formed as an integral part of the containment duct 1100. Additionally, the fibers within the flange 1101 are pulled taut, providing substantially alignment and increased strength. Additionally, the matrix distribution within the containment duct is substantially uniform across the duct body 1103 and across the flanges 1101. The substantially uniform distribution within the flanges 1101 contribute the high strength of the flanges 1101. The flanges 1101, like the wall-portions have pre-stressed reinforcing fibers and uniform matrix distribution.

The method and tool 100 of the present invention provides composites of near-net-shape after impregnation and curing of the fiber fabric preform 301. The tool 100 provides the fiber fabric preform 301 with the shape of the desired product, while impregnating it with matrix material 601. Once cured, the matrix material 601 impregnated fiber fabric preform 301 is of near-net-shape, requiring little or no trimming. The method for manufacturing fiber reinforced matrix composites according to the present invention provides composite parts substantially having the shape of the finished product, requiring little or no trimming prior to installation.

Removal of the finished part from the tool 100 of the present invention is relatively simple and inexpensive. In addition to the optional release film, the first endplate 101 detaches from the body allowing removal of the part from the body 105. The tool 100 does not require disassembly beyond the components of the tool 100 that detach during the curing cycle. Therefore, the removal of the finished part requires very little labor and is inexpensive.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for fabricating a reinforced matrix composite having low porosity, comprising: providing a tool;
   providing a composite preform on a portion of the tool, the composite preform having a fibrous structure and having a center and outer edges;
   applying a preselected amount of matrix material onto the preform at preselected locations along the preform to produce a coated preform, the matrix material having a preselected curing temperature;
   applying a layer of barrier material to at least a portion of the coated preform, to direct the flow of matrix material into the preform;
   heating the composite preform to a preselected temperature, the preselected temperature being sufficient to render the matrix material viscous, but below the preselected curing temperature of the matrix material to cause expansion of the tool which causes tensional force across the composite preform;
   reducing pressure to an interior of the composite preform, while increasing the pressure to the barrier material, thereby creating a pressure differential;
   holding the temperature at the preselected temperature while flowing the matrix material from the predetermined locations into the composite preform as a result of the pressure differential to force gases from the fibrous structure;
   heating the composite preform to the preselected curing temperature; and
   curing the matrix material at the preselected curing temperature for a predetermined amount of time and cooling to ambient temperature to form a reinforced matrix composite having a low void space content and a substantially uniform matrix distribution
   wherein the matrix material flows in a direction from the center to the outer edges.

2. The method of claim 1, wherein the reinforced matrix composite has a void space content of up to about 2.5%.

3. The method of claim 2, wherein the reinforced matrix composite has a void space content of up to about 1.0%.

4. The method of claim 1, wherein the reinforced matrix composite is a containment fan duct for a gas turbine engine.

5. The method of claim 1, wherein the matrix material is applied with a greater amount of matrix material in a midpoint between two edges of the composite preform to facilitate flow from the center to the outer edges.

6. The method of claim 1, wherein the features comprise multiple resin flow paths in the composite preform.

7. The method of claim 6, wherein the preform shape include stiffeners or inserts.

8. The method of claim 1, wherein the fibrous structure comprises triaxial woven fabric tows.

9. The method of claim 8, wherein the tows comprise graphite fibers.

10. The method of claim 1, wherein the matrix material comprises epoxy.

11. The method of claim 1, wherein the barrier material comprises silicone.

* * * * *

UNITED STATES PATENT AND TRADEMARK OFFICE
CERTIFICATE OF CORRECTION

| | | |
|---|---|---|
| PATENT NO. | : 7,867,566 B2 | Page 1 of 1 |
| APPLICATION NO. | : 11/925331 | |
| DATED | : January 11, 2011 | |
| INVENTOR(S) | : Blanton et al. | |

It is certified that error appears in the above-identified patent and that said Letters Patent is hereby corrected as shown below:

On the Title page, in Field (73), under "Assignee", in Column 1, Line 2, delete "Schenectady" and insert -- Schenectady, NY (US) --, therefor.

In Column 18, Lines 42-43, in Claim 6, delete "features comprise multiple resin flow paths in the composite perform." and insert -- composite preform comprises multiple resin flow paths. --, therefor.

Signed and Sealed this
Twenty-ninth Day of March, 2011

David J. Kappos
*Director of the United States Patent and Trademark Office*